Dec. 29, 1959  L. H. LEONARD, JR  2,918,807
ABSORPTION REFRIGERATION SYSTEMS OF THE INTERNAL COIL TYPE
Filed April 23, 1956  9 Sheets-Sheet 1

*INVENTOR.*
LOUIS H. LEONARD, JR.
BY
*ATTORNEY.*

Dec. 29, 1959     L. H. LEONARD, JR     2,918,807
ABSORPTION REFRIGERATION SYSTEMS OF THE INTERNAL COIL TYPE
Filed April 23, 1956     9 Sheets-Sheet 2

INVENTOR.
LOUIS H. LEONARD, JR.
BY
ATTORNEY.

Dec. 29, 1959 L. H. LEONARD, JR 2,918,807
ABSORPTION REFRIGERATION SYSTEMS OF THE INTERNAL COIL TYPE
Filed April 23, 1956 9 Sheets-Sheet 4

INVENTOR.
LOUIS H. LEONARD, JR.
BY Herman Seid

ATTORNEY.

Dec. 29, 1959 L. H. LEONARD, JR 2,918,807
ABSORPTION REFRIGERATION SYSTEMS OF THE INTERNAL COIL TYPE
Filed April 23, 1956 9 Sheets-Sheet 5
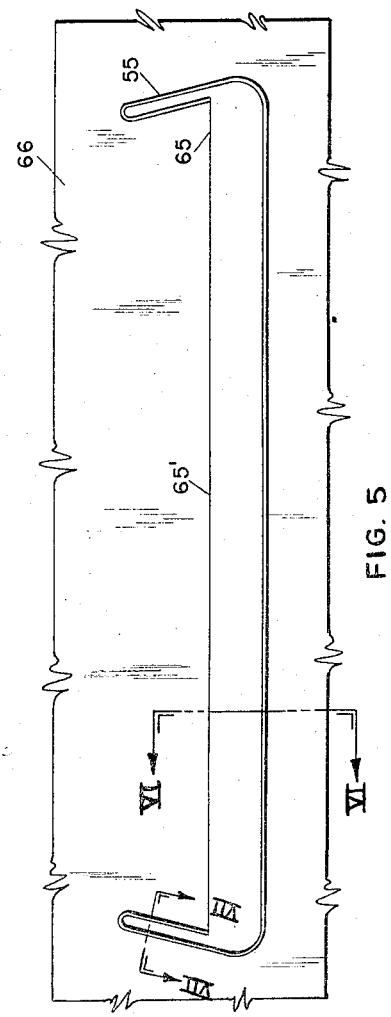
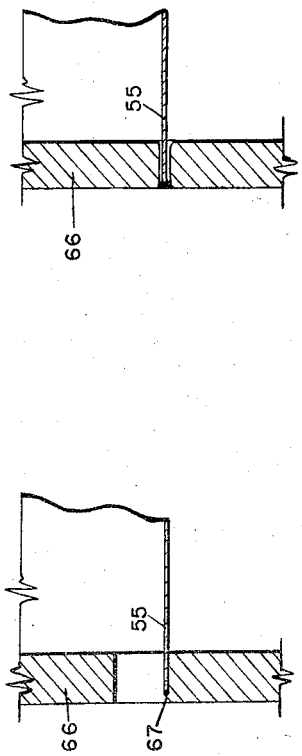
INVENTOR.
LOUIS H. LEONARD, JR.
BY
ATTORNEY.

Dec. 29, 1959    L. H. LEONARD, JR    2,918,807
ABSORPTION REFRIGERATION SYSTEMS OF THE INTERNAL COIL TYPE
Filed April 23, 1956                 9 Sheets-Sheet 6

INVENTOR.
LOUIS H. LEONARD, JR.
BY
ATTORNEY.

Dec. 29, 1959     L. H. LEONARD, JR     2,918,807
ABSORPTION REFRIGERATION SYSTEMS OF THE INTERNAL COIL TYPE
Filed April 23, 1956     9 Sheets-Sheet 7

*INVENTOR.*
LOUIS H. LEONARD, JR.
BY
ATTORNEY.

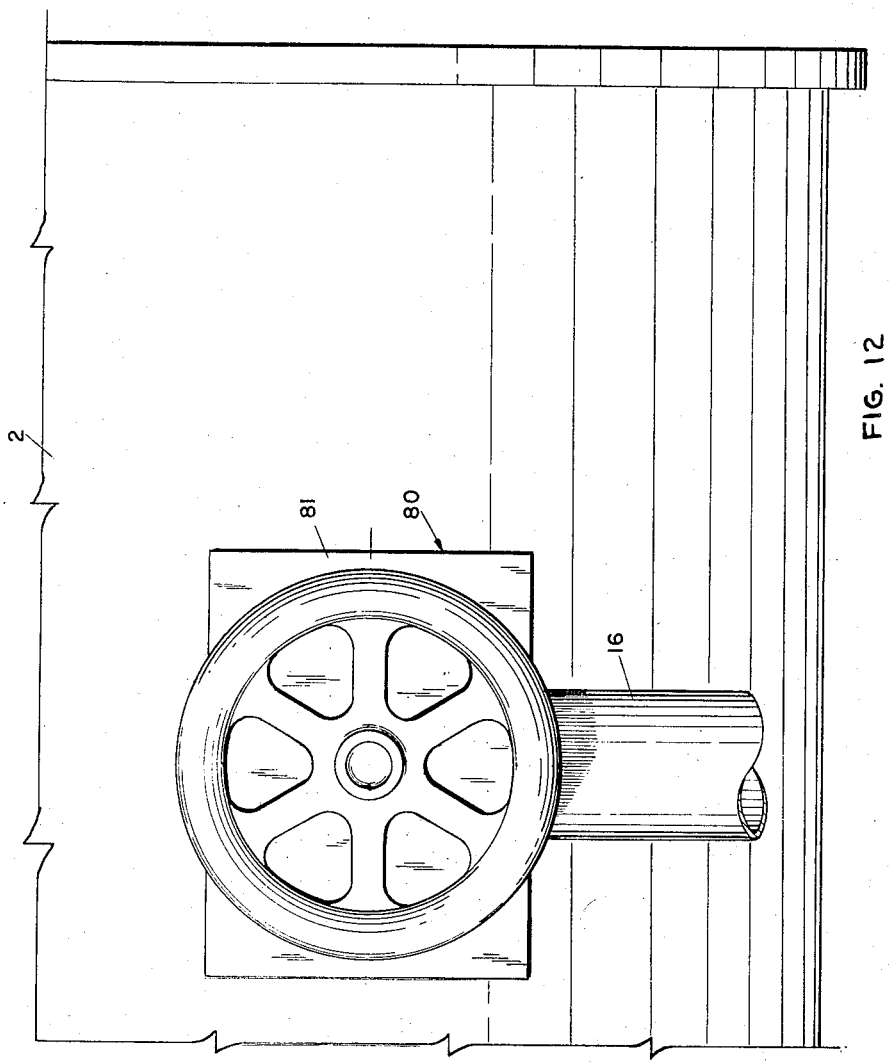

United States Patent Office 2,918,807
Patented Dec. 29, 1959

2,918,807

ABSORPTION REFRIGERATION SYSTEMS OF THE INTERNAL COIL TYPE

Louis H. Leonard, Jr., East Syracuse, N.Y., assignor to Carrier Corporation, Syracuse, N.Y., a corporation of Delaware Application April 23, 1956, Serial No. 580,052

15 Claims. (Cl. 62—476)

This invention relates to absorption refrigeration systems and, more particularly, to an absorption refrigeration system of the internal coil type which may be manufactured economically and which is relatively simple in operation.

The chief object of the present invention is to provide an absorption refrigeration system of the internal coil type which is economical in manufacturing costs and which is relatively simple in operation.

An object of the invention is to provide an absorption refrigeration system of the internal coil type in which solidification of solution is substantially eliminated and which permits simple automatic operation.

A further object is to provide an absorption refrigeration system of the internal coil type including a simplified and improved evaporator construction.

A still further object is to provide an absorption refrigeration system of the internal coil type including simplified means permitting excess liquid refrigerant to be withdrawn from the evaporator which greatly enlarge available space in the evaporator-absorber shell.

A further object is to provide an absorption refrigeration system of the internal coil type including simplified valve means to control passage of strong solution from the generator to the absorber of the system.

A still further object is to provide an improved method of assembling an evaporator in a shell of an absorption refrigeration system. Other objects of the invention will be readily perceived from the following description.

This invention relates to an absorption refrigeration system comprising, in combination, a generator, a condenser, and a shell containing an absorber and an evaporator. Vapor from the evaporator flows to the absorber to be absorbed by solution therein. The absorber includes a plurality of tubes through which cooling medium is passed in heat exchange relation with solution and vapor exteriorly of the tubes. A pan-like member in the shell cooperates with the shell to form the evaporator, the pan-like member being placed above the tubes in the shell. Means are provided to supply strong solution from the generator to the absorber. Means are provided to supply weak solution from the absorber to the generator.

Preferably, means are provided, connected to the evaporator pan, to regulate the level of liquid refrigerant collected therein, said means discharging excess liquid refrigerant in the absorber to mix with solution therein. The evaporator may comprise a pan-like member extending longitudinally of the shell having supports for the pan extending longitudinally of the shell attached to bar members on the ends of the shell. A plurality of tubes are placed within and above the pan through which medium to be cooled passes. Support sheets are provided for the tubes. Eliminators are supported on the pan, the eliminators extending longitudinally of the tubes and being placed on opposite sides of the tubes. Discharge means for recirculated refrigerant are supported in the shell above the tubes. A condensate return header is placed in the shell above the tubes having slots in opposite sides thereof to discharge condensate over the tubes. Baffles are provided to close the top of the evaporator to assure vapor flowing through the eliminators to the absorber.

If desired, the terminal tube sheets supporting the tubes of the evaporator may have a slot therein extending laterally of the shell. A header member is attached to the exterior of the terminal portion of the tube sheet. A line connects the header with the recirculating means. The slot connects the header with the evaporator pan to permit liquid refrigerant collected in the bottom of the pan to be withdrawn through the slot to the header and to be supplied from the header by the recirculating means to discharge means in the evaporator.

If desired, the strong solution supply means may include a box-like member mounted on the side of the shell having an inlet port therein and an outlet port therein extending through the shell. A partition member is provided in the box to form a valve seat. A movable diaphragm member is placed in the box and is adapted to nest against the partition member to regulate passage of solution through the box.

The attached drawings illustrate a preferred embodiment of the invention, in which Figure 1 is a diagrammatic view illustrating the absorption refrigeration system of the present invention;

Figure 5 is a view in elevation of the evaporator pan or tank supported in the end of the shell;

Figure 6 is a sectional view taken along the lines VI—VI of Figure 5;

Figure 7 is sectional view taken on the line VII—VII of Figure 5;

Figure 12 is a view in elevation showing the strong solution valve mounted on the evaporator-absorber shell.

Figure 1:
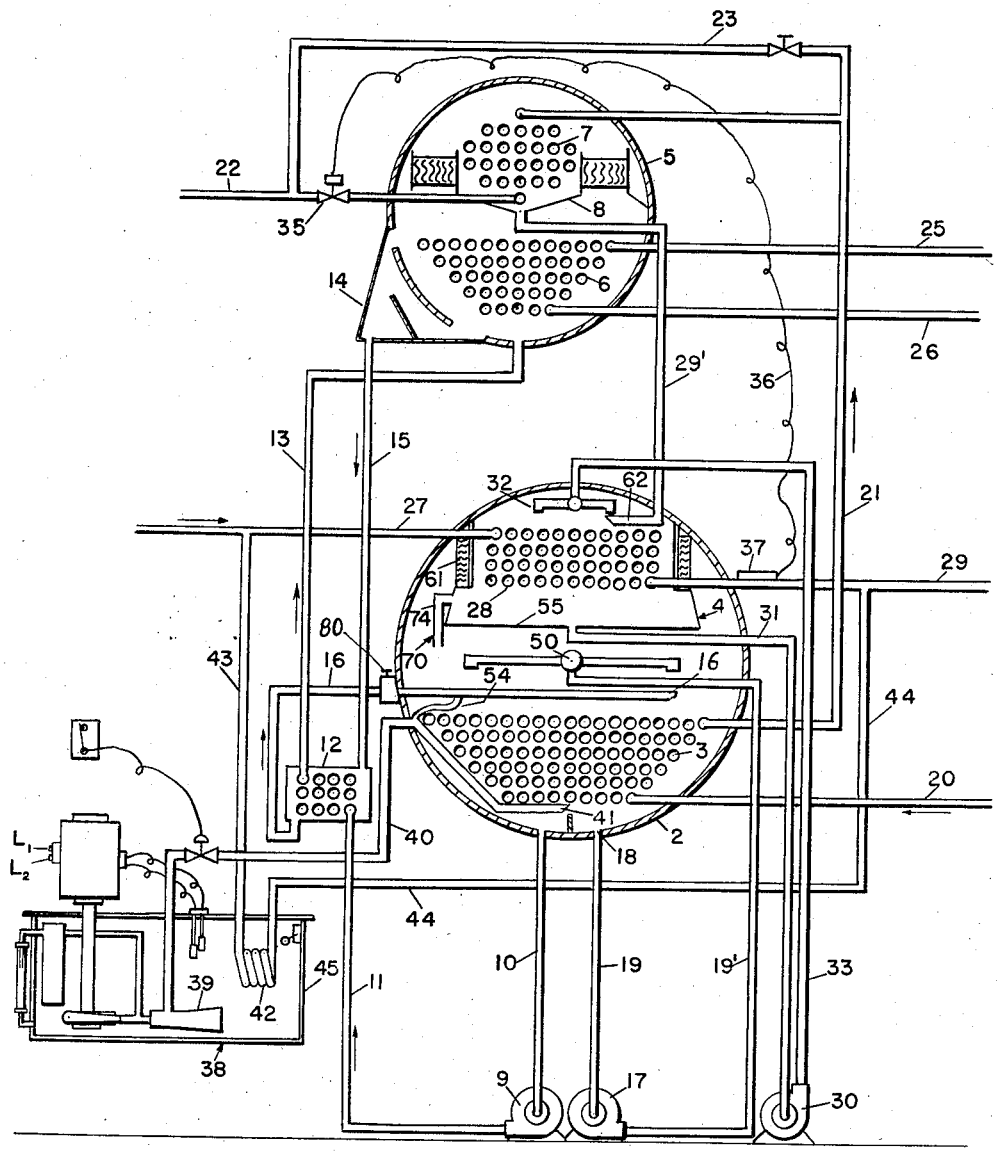

Referring to the attached drawings there is illustrated diagrammatically in Figure 1, the absorption refrigeration system of the present invention. The system comprises a shell 2 containing a plurality of tubes 3 which cooperate with the shell to form an absorber. Placed in shell 2 above absorber 3 is a pan-like member which cooperates with shell 2 to form an evaporator 4. Evaporator 4 will be described in greater detail hereinafter.

Figure 2:
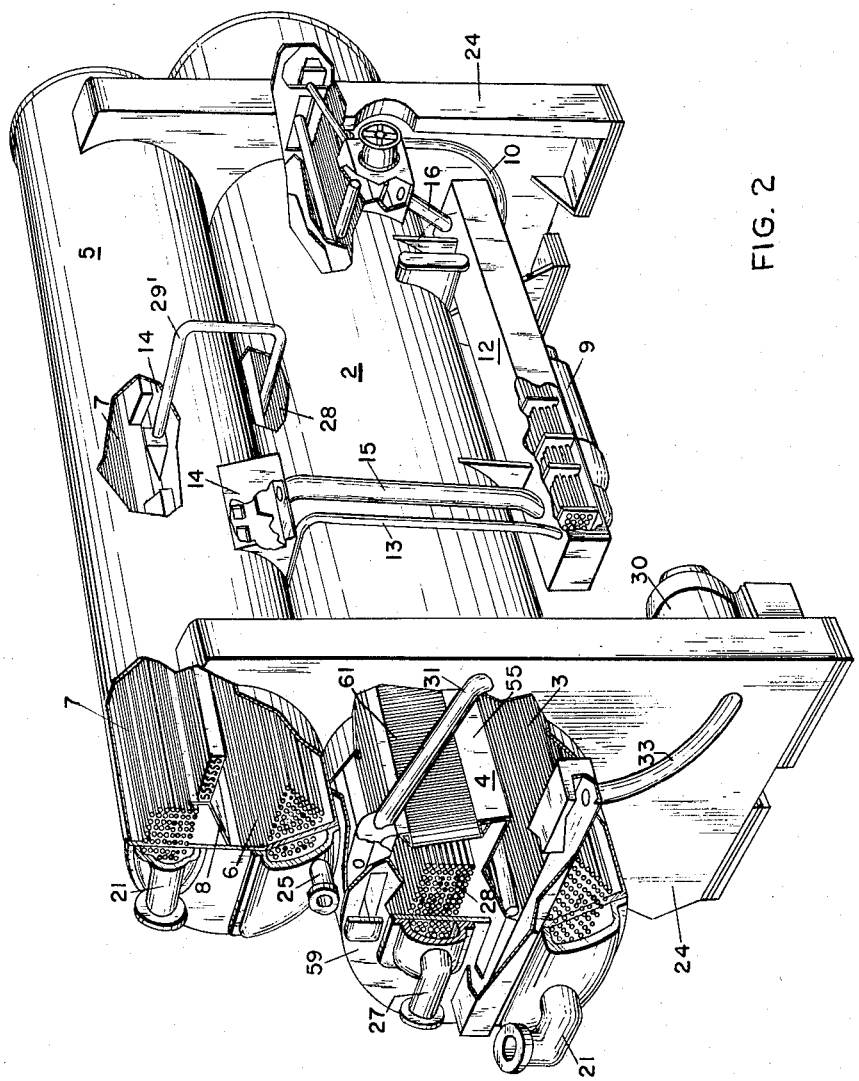
Figure 2 is a perspective view of the absorption refrigeration system partially broken away to disclose the interior construction.
Figure 3:
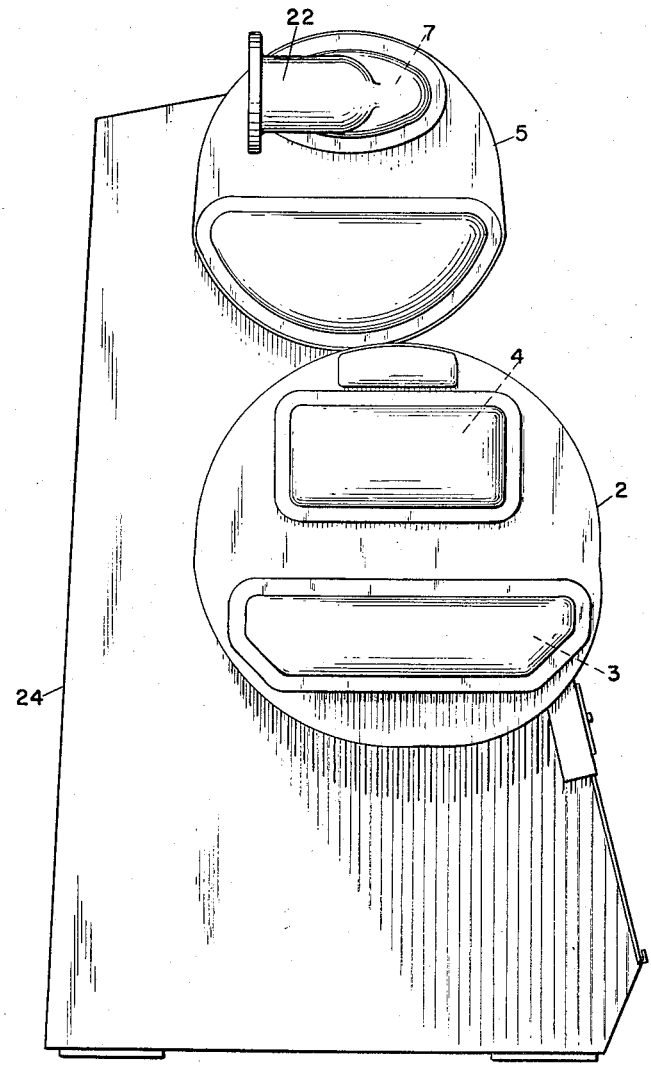
Figure 3 is a view in end elevation illustrating the opposite end of the system shown in Figure 2.

A second shell 5 preferably, is placed above the first shell. Tubes 6 extend in the lower portion of shell 5 and cooperate with shell 5 to form a generator. A plurality of tubes 7 are placed in the upper portion of shell 5 to form a condenser. The tubes 7 cooperate with the pan-like member 8 to form the condenser. Both shells 2 and 5 are mounted in desired position on supports 24 as best shown in Figures 2 and 3.

Pump 9 withdraws weak solution from absorber 3 through line 10. Pump 9 forwards weak solution through line 11 to heat exchanger 12 in which the weak solution is placed in heat exchange relation with strong solution returning from the generator, as hereinafter described. The weak solution is then forwarded from heat exchanger 12 through line 13 to generator 6. Strong solution flows from generator 6 through overflow arrangement 14, line 15, heat exchanger 12 and line 16 to the absorber, preferably, being discharged therein adjacent one end of the shell 2. That is, strong solution flows through forces of gravity from the generator to the absorber. It will be understood, of course, if desired, the strong solution may be discharged in the absorber over the tubes therein.

Pump 17 serves as an absorber pump and is employed to withdraw a solution of intermediate concentration from absorber 3 through outlet 18 and line 19. Pump 17 forwards the solution of intermediate concentration through line 19' to the spray arrangement 50 of the absorber. Spray arrangement 50 serves to distribute the recirculated solution over the tubes throughout the length of the absorber 3. It will be understood the strong solution mixes to some extent with solution in the absorber and that further mixing occurs as the pump 17 forwards the mixed solution so that a solution having a concentration intermediate the concentration of the strong and weak solution is circulated. Reference is made to my copending application, Serial No. 505,369, filed May 2, 1955, now Patent No. 2,840,997, for a more detailed description of the flow of solution in the system.

Condensing water is forwarded by a pump (not shown) through line 20 to the tubes 3 of the absorber. The condensing water passes from the tubes 3 of the absorber through line 21 to the tubes 7 of the condenser. Condensing water leaves the tubes 7 of the condenser through line 22. A by-pass line 23 is provided about the tubes of the condenser extending from line 21 to line 22.

Steam is supplied to the tubes 6 of the generator through line 25. If desired, a suitable pressure regulating valve (not shown) may be placed in line 25 to assure desired steam pressure in the generator. Steam condensate leaves the tubes of generator 6 through line 26, a suitable steam trap (not shown) being provided in line 26 to assure that only condensate leaves the generator.

Medium to be cooled is forwarded by a pump (not shown) through line 27 to the tubes or coil 28 of evaporator 4. The cooled medium leaves the tubes 28 through line 29 and is forwarded to a place of use such as the central station of an air conditioning system. The medium after passing to the central station returns to the evaporator 4 through line 27 to be again cooled and reused.

Condensate leaves condenser 7 through line 29' and is returned through the evaporator and discharged therein over the tubes 28 to wet the tubes. It will be appreciated the refrigerant is flashed or vaporized by the heat exchange relation with medium passing through the tubes. The flashed vapor passes to absorber 3 to be absorbed by solution therein.

Pump 30 serves to recirculate liquid refrigerant collected in the evaporator about the evaporator. Pump 30 is connected to the evaporator by line 31 to withdraw liquid refrigerant therefrom. Pump 30 forwards the liquid refrigerant through line 33 to spray arrangement 32 of the evaporator, the liquid refrigerant flash-cooling upon discharge in the evaporator, remaining liquid refrigerant wetting the tubes to cool medium passing through the tubes. The heat exchange relation between medium passing through the tubes and the liquid refrigerant on the exterior of the tubes evaporates liquid refrigerant, the vapor passing to the absorber, as previously described.

A valve 35 is placed in line 22 between the tubes 7 of the condenser and the juncture of by-pass line 23 with line 22. Valve 35 regulates passage of condensing water through the tubes of condenser 7. Valve 35 is connected by a capillary line 36 to a bulb 37 placed in contact with line 29. Bulb 37 reflects the temperature of chilled medium leaving the evaporator, so that valve 35 is actuated responsive to the temperature of chilled medium leaving the evaporator which, in effect, indicates the load imposed upon the system.

A suitable purge arrangement 38 is provided to remove non-condensible gases from the absorber. The ejector 39 of purge arrangement 38 is connected by line 40 to a purge line 41 extending longitudinally of the absorber. The cooling coil 42 of purge arrangement 38 is connected to line 27 by line 43 and to line 29 by line 44 permitting medium to be employed for cooling solution in the purge tank 45. Purge arrangement 38 is disclosed and claimed in my copending application, Serial No. 565,324, filed February 14, 1956, and reference is made to such application for a more complete description of the purging arrangement.

Figure 4:
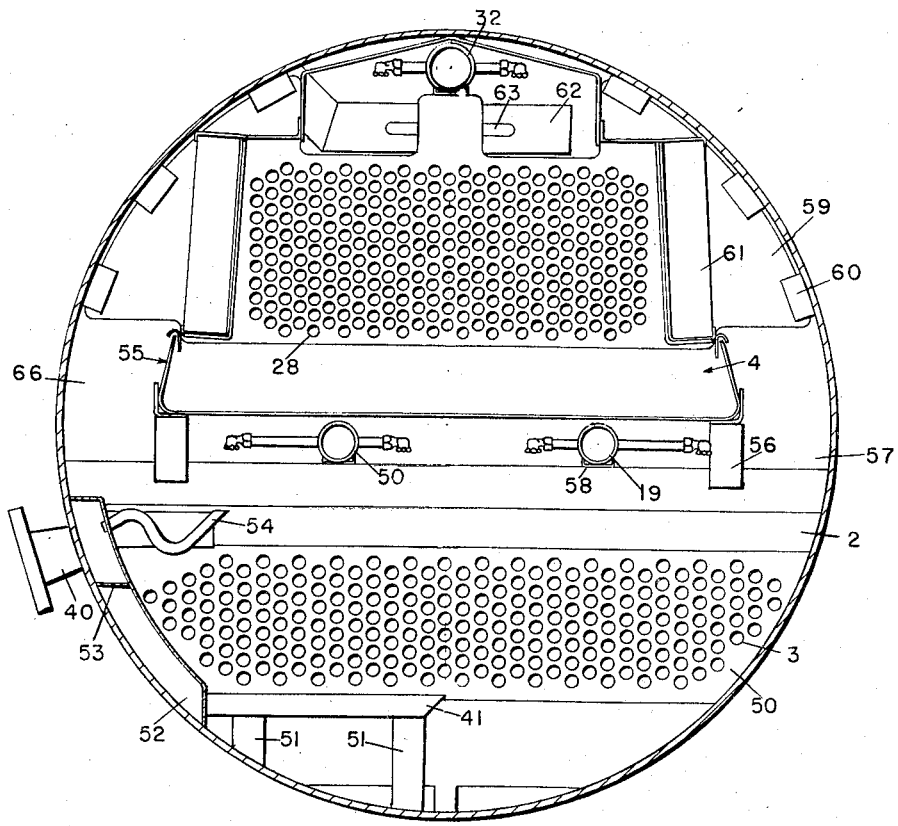
Figure 4 is a sectional view through the absorber-evaporator shell.

Referring to Figure 4, there is shown a section through the absorber-evaporator shell. Tubes 3 of the absorber extend through one or more support plates 50. The purge line 41 is secured in position by suitable supports 51. The purge line 41 is connected to a purge header 52 containing a baffle 53 which requires fluid to take a circuitous path when withdrawn therefrom through line 40. A pipe 54 is connected to header 52. Pipe 54 is disposed in a position to receive a minor amount of solution sprayed in the absorber, thus maintaining solution in the purging arrangement at desired concentration.

The evaporator 4 includes a pan 55 extending longitudinally of shell 2. The terminal tube sheets or support sheets constitute the ends of pan 55. Supports 56 extend longitudinally of the shell to support pan 55 in desired position. These supports are attached to bar members 57 secured to the interior wall of the shell. The bar members 57 also support channels 58 for the spray headers 50.

A plurality of tubes 28 extend longitudinally of the shell above pan 55. Medium to be cooled passes through these tubes in heat exchange relation with liquid refrigerant sprayed thereover. The tubes are supported in position by support sheets 59 welded or otherwise attached to tabs 60 secured to the inner side of the shell. Eliminators 61 are supported on pan 55 and extend longitudinally of the shell. The eliminators 61 are placed on opposite sides of the tubes 28.

A vapor condensate return header 62 having slots 63 on opposite sides thereof is placed over the tubes and serves to discharge condensate over the tubes.

Spray arrangement 32 receives recirculated liquid refrigerant and discharges the same over the tubes thereby wetting the tubes to assure heat exchange relation between medium passing through the tubes and the sprayed refrigerant. The sprayed refrigerant, of course, is evaporated by the heat exchange relation carrying off heat from the medium passing through the tubes. The vapor so formed passes through the eliminators 61 and downward to the absorber where it is absorbed by solution. It will be observed the top of the evaporator is closed to assure that vapor so formed passes through the eliminators 61 to the absorber.

Referring now to Figures 5, 6 and 7 there is shown the manner in which the pan 55 is secured in place in the shell. As explained above, the terminal tube sheets 66 form the end walls of pan 55. Slots 65 having a configuration similar to the configuration of the pan are formed in the terminal tube sheets 66 of the shell 2. It will be noted the slots 65 are beveled as shown at 67 at their exterior edges for a purpose hereinafter described. Preferably, one slot as indicated at 65' is formed considerably larger than the thickness of the pan in order to provide an opening through the terminal tube sheet 66 for a purpose hereinafter described.

In assembling the construction, pan 55 is passed through the slots in the tube sheets and are supported by the sheets. The edges of the pan are then welded to the tube sheets to secure the pan in place. In order to assure that sufficient material is present to secure the pan in desired position, the bevels are employed. The welds are then ground to form a smooth surface on the tube sheet. It will be obvious such construction provides many advantages in its simplicity, economy and ease of assembly.

Figure 9:
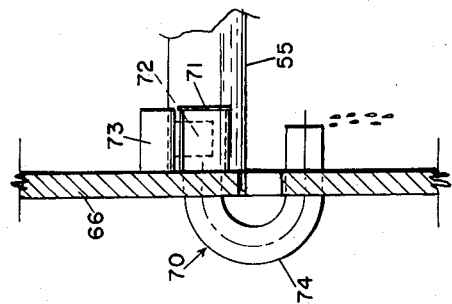
Figure 9 is a sectional view taken on the line IX—IX of Figure 8.
Figure 8:
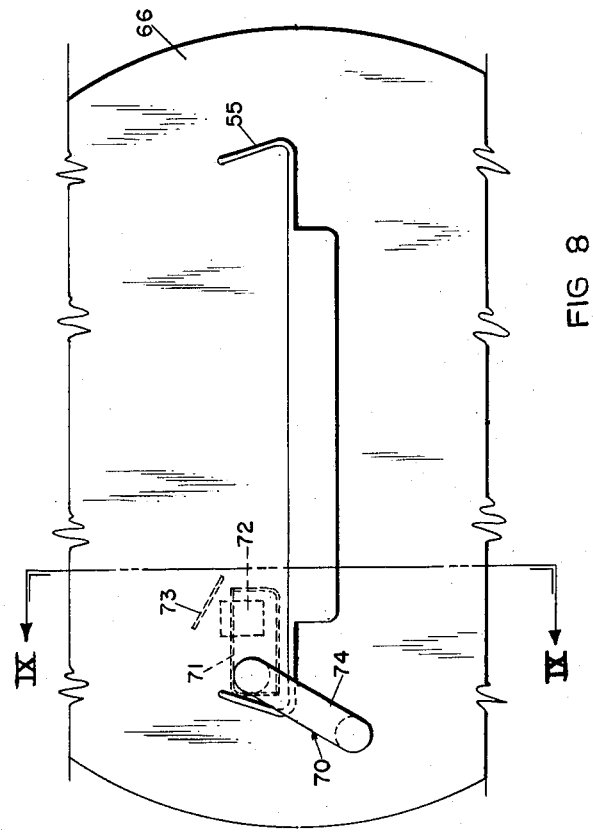
Figure 8 is a view in elevation showing the overflow arrangement.

In Figures 8 and 9 I have shown an overflow arrangement designated generally at 70 and designed to maintain the level of liquid refrigerant in pan 55 of the evaporator. Overflow arrangement 70 includes a closed box member 71 placed in an end of pan 55. A tube 72 extends through one wall of the box 71. The tube is open so that excess refrigerant in pan 55 flows through tube 72 into box 71. Preferably, a baffle 73 is placed above tube 72 to assure that liquid refrigerant sprayed in the evaporator does not enter the box. Box 71 is connected by a line 74 to the absorber so that excess refrigerant entering box 71 flows through line 74 to the absorber, being discharged in the absorber to mix with solution therein. This arrangement is highly desirable in my invention since it serves to eliminate solidification of solution and permits simple automatic operation of the machine.

If desired, overflow line 74 may be connected to the main absorber purge line 41. In such case, excess liquid refrigerant rather than returning directly to the absorber is withdrawn to the purge tank of the purging arrangement so that a large part of such refrigerant is removed from the system. This is generally not as desirable since it requires the addition of make up refrigerant to the system.

Figure 11:
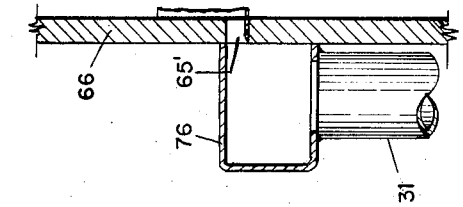
Figure 11 is a sectional view of the header shown in Figure 10.
Figure 10:
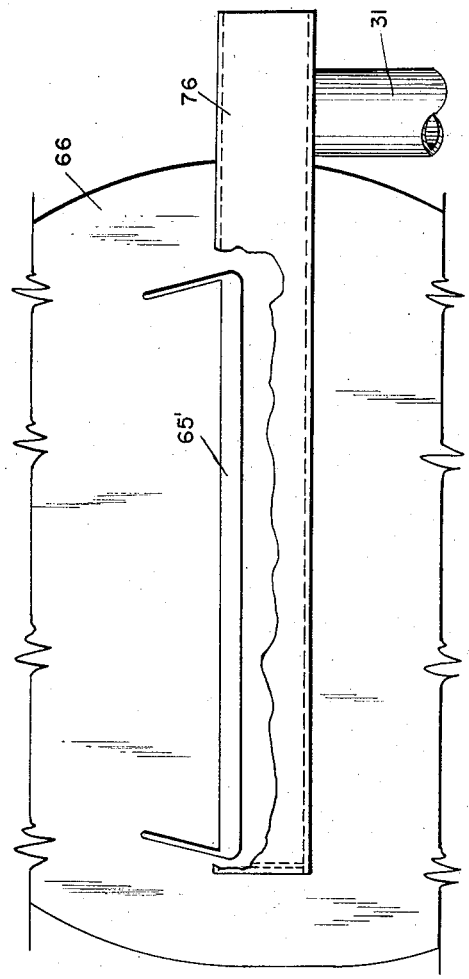
Figure 10 is a view in elevation showing the liquid refrigerant header.

In Figures 10 and 11, I have shown the manner in which line 31 connecting pump 30 with the evaporator pan 55 is connected to the evaporator pan. It will be recalled that the terminal tube sheet 66 forming an end of the pan is provided with an enlarged slot 65'. A header 76 is welded to the exterior side of tube sheet 66 about the slot. Thus, the slot connects the header with the evaporator pan so that liquid refrigerant collected in the bottom of the pan flows through the slot to the header. Pump 30 is connected to the header 76 by line 31 and serves to withdraw liquid refrigerant from the header and to forward the liquid refrigerant so withdrawn from the header through line 33 to the spray arrangement 32 of the evaporator, thus discharging liquid refrigerant over the tubes 28 therein. This arrangement provides a large draining area without blocking the flow of refrigerant vapor around the sides of the evaporator pan.

Figure 13:
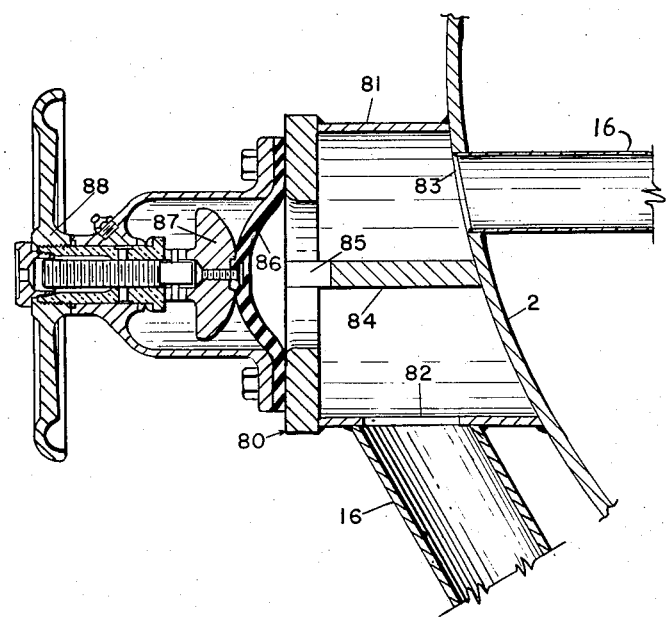
Figure 13 is a sectional view of the strong solution valve shown in Figure 12.

In Figures 12 and 13, I have shown a valve arrangement 80 mounted on the side of shell 2 in the strong solution line 16. Valve 80 is held open during operation of the system and serves as a service valve to allow storage of solution in the generator. It will be appreciated while I have illustrated the valve as being placed in the strong solution line it will be understood similar valves may be employed for similar purposes in the weak solution line, vapor condensate line, the purge arrangement, and the like.

Referring to Figures 12 and 13, a box-like member 81 is attached to the side of shell 2. Box-like member 81 includes an inlet port 82 connecting box member 81 with line 16 and an outlet port 83 extending through the side of shell 2, strong solution discharge line 41 being connected to outlet 83 of box 81. A partition 84 is disposed in box 81. Partition 84 has a concave configuration as shown at 85 to cooperate with the diaphragm 86 of the valve member 87 when it is desired to prevent passage of solution through the box. Diaphragm 86 has a concave configuration in its normal position and is adapted to be flexed in the opposite direction to a convex configuration which cooperates with the concave portion 85 of partition 84 to close the box to the passage of solution. Suitable manual means are provided as shown at 88 to move or flex the diaphragm 86 to a position closing the valve.

The term "weak solution" is used herein to describe a solution weak in absorbing power. The term "strong solution" is used herein to define a solution strong in absorbing power.

The preferred absorbing solution is a solution of lithium bromide in water. The preferred refrigerant is water. Preferably, the solution concentration leaving the generator is about 66%. A greater concentration may permit crystallization to occur causing solidification in the heat exchanger and perhaps in other portions of the system.

It will be noted that regulation of the flow of condensing water through the tubes of the condenser is employed to control operation of the refrigeration system. Suitable electrical control means may be provided, of course, to permit actuation of the motors (not shown) of the various pumps, etc. Any suitable control arrangement may be provided. If desired, the control arrangement shown in my Patent No. 2,722,805, granted November 8, 1955 may be employed.

Considering operation of the absorption refrigeration system, medium to be cooled is forwarded through line 27 to the tubes 28 of evaporator 4 and leaves the tubes 28 of evaporator 4 through line 29. At start up, the pumps are actuated, pump 9 withdrawing weak solution from the absorber through line 10, forwarding the weak solution through line 11, heat exchanger 12 and line 13 to generator 6.

Refrigerant vapor is boiled from the solution in the generator 6, the vapor passing to condenser 7 and being condensed therein, the condensate returning to the evaporator through line 29'. Strong solution leaves the generator through overflow arrangement 14, line 15, heat exchanger 12, line 16, and is discharged preferably over an end of the absorber tube bundle through line 41. The strong solution is flash-cooled to some slight extent as it is discharged in the absorber. The discharged strong solution mixes with solution in the absorber and is withdrawn from the absorber through outlet 18 and line 19 by pump 17, the solution of intermediate concentration so formed being returned to the absorber through line 19' and being sprayed over the tube bundle by spray arrangement 50. It will be appreciated that the mixture of strong solution and solution in the absorber forming the solution of intermediate concentration is further mixed and cooled in passage through the recirculation system.

Pump 30 serves to withdraw liquid refrigerant from the pan 55 of evaporator 4 and to recirculate the liquid refrigerant through lines 31, 33 to the discharge means 32 of the evaporator. The discharge means 32 sprays the liquid refrigerant over the tubes 28 of the evaporator 4. The tubes are wetted by the liquid refrigerant, the wetted refrigerant being vaporized by the heat exchange relation with medium passing through the tubes. Vapor so formed passes outwardly through the eliminators 61 and flows downward to the absorber 3 being absorbed by solution therein.

Vapor condensate is returned from the condenser 7 through line 29' to the evaporator, being flash-cooled upon discharge therein over the tubes 28. Thus, the vapor condensate aids in wetting the tubes to cool the medium passing therethrough.

The present arrangement provides an economical and simple absorption refrigeration system. By placing the eliminator sections of the evaporator at the sides of the tubes the eliminator area can be increased, thus reducing undesirable pressure drops and increasing the capacity of the machine. In addition, such arrangement permits the refrigerant spray header to be placed in the uppermost portion of the absorber shell, thus rendering all the space in the shell useable so that smaller shells may be employed. Such arrangement permits more effective wetting of the tubes of the evaporator. Manufacturing costs are reduced considerably due to the simplicity of construction. With the arrangement so provided substantially all spaces of the shell serve a useful function, thus permitting the size of the shell to be decreased.

The solution valve arrangement provided by the present invention improves machine appearance and simplifies piping as well as reduces field labor and minimizes leak possibilities.

The present invention provides a simplified overflow arrangement which permits excess liquid refrigerant in the evaporator tank to be forwarded to the absorber. Such arrangement permits simple automatic operation of the machine and eliminates solidification of solution in the system.

The chilled water drain provided on the side of the flash tank extending through the side of the absorber shell simplifies the design of the machine thereby reducing manufacturing costs, provides a large drain area to reduce the amount of head required to drain the liquid refrigerant from the flash tank, thus eliminating a sump and providing greater chilled water storage capacity. It will be appreciated that with this type of construction there is no restriction in the vapor passage area from the evaporator eliminators down to the absorber. It is extremely desirable in design of the system to keep this pressure drop as low as possible.

The present invention provides a simple method of securing the evaporator tank in the shell thereby reducing manufacturing costs.

While I have described a preferred embodiment of the invention it will be appreciated the invention is not so limited since it may be otherwise embodied within the scope of the following claims.

I claim:

1. In an absorption refrigeration system, the combination of a generator, a condenser, a shell containing an absorber and an evaporator, vapor from the evaporator flowing to the absorber to be absorbed by solution therein, the absorber including a plurality of tubes through which cooling medium is passed in heat exchange relation with solution and vapor exteriorly of the tubes, a pan-like member in the shell cooperating with the shell to form the evaporator, said member being disposed above the tubes in the shell, the evaporator including a heat exchange member through which medium to be cooled passes, means to forward weak solution from the absorber to the generator, means to discharge refrigerant in the evaporator in heat exchange relation with medium passing through the heat exchange member, means to supply strong solution from the generator to the absorber, means to circulate solution of intermediate concentration in the absorber, means to withdraw liquid refrigerant from the evaporator and to return the liquid refrigerant to the evaporator in heat exchange relation with medium passing through the heat exchange member therein, an overflow arrangement connected to the evaporator to regulate the level of liquid refrigerant collected therein, excess refrigerant overflowing through said arrangement and being discharged in the absorber to mix with solution therein, the overflow arrangement comprising a closed box-like member disposed in the evaporator pan, an open tube protruding through the wall of the box into the pan to collect excess liquid refrigerant therein, and a line connected to the box through which liquid refrigerant collected in the box passes to the absorber.

2. An absorption refrigeration system according to claim 1 in which a baffle is placed over and spaced from the protruding end of the tube to shield the tube against liquid refrigerant discharged in the box.

3. In an absorption refrigeration system, the combination of a generator, a condenser, a shell containing an absorber and an evaporator, vapor from the evaporator flowing to the absorber to be absorbed by solution therein, the absorber including a plurality of tubes through which cooling medium is passed in heat exchange relation with solution and vapor exteriorly of the tubes; said evaporator comprising a pan-like member cooperating with the shell to form the evaporator, said pan-like member extending longitudinally of the shell, supports for the pan extending longitudinally of the shell attached to bar members on the terminal portions of the shell, a plurality of tubes placed within and above the pan through which medium to be cooled passes, support sheets for the tubes, eliminators supported on the pan extending longitudinally of the shell on opposite sides of the tubes, discharge means for recirculated liquid refrigerant supported in the shell above the tubes, a condensate return header placed in the shell above the tubes, having openings therein to discharge condensate over the tubes, and baffles closing the top of the evaporator to assure vapor flowing through the eliminators to the absorber; means to forward weak solution from the absorber to the generator, means to supply strong solution from the generator to the absorber, means to circulate solution of intermediate concentration in the absorber, means to withdraw liquid refrigerant from the evaporator and to return the liquid refrigerant to the evaporator through said discharge means in heat exchange relation with medium to be cooled passing through the tubes therein, means to return condensate from the condenser to the evaporator return header, and an overflow arrangement connected to the evaporator to regulate level of liquid refrigerant collected therein, said arrangement discharging excess collected liquid refrigerant into the absorber to mix with solution therein.

4. An absorption refrigeration system according to claim 3 in which the evaporator tube sheets constitute support sheets, one of said sheets having a slot therein extending laterally of the shell, a header member attached to the exterior of the slotted sheet about the slot, a line connecting the header with the liquid refrigerant recirculating means, said slot connecting the header with the evaporator pan whereby liquid refrigerant collected in the bottom of the pan passes through the slot to the header and is withdrawn from the header by the recirculating means and supplied to the discharge means in the evaporator.

5. An absorption refrigeration system according to claim 4 including a box-like member mounted on the side of the shell having an inlet port therein connected to the strong solution line and an outlet port therein extending through the shell connected to strong solution discharge means within the shell, a partition member in the box forming a valve seat, and a movable diaphragm member adapted to be moved against the seat to discontinue passage of strong solution through the box.

6. In an absorption refrigeration system, the combination of a generator, a condenser, a shell containing an absorber and an evaporator, vapor from the evaporator flowing to the absorber to be absorbed by solution therein, the absorber including a plurality of tubes through which cooling medium is passed in heat exchange relation with solution and vapor exteriorly of the tubes, a pan-like member in the shell cooperating with the shell to form the evaporator, a heat exchange member in the evaporator through which medium to be cooled passes, means for discharging liquid refrigerant over said heat exchange member, the terminal support sheets for the heat exchange member forming the ends of said pan-like member, one terminal sheet having a slot therein extending laterally of the machine, a header member attached to the exterior of said slotted terminal sheet, the slot connecting the header with the evaporator pan whereby liquid refrigerant collected in the bottom of the pan passes through the slot to the header, a line connecting the header with means for withdrawing liquid refrigerant from the evaporator and for returning the liquid refrigerant to the evaporator discharge means, means for withdrawing liquid refrigerant from the header through said line and for returning liquid refrigerant to the evaporator discharge means through a second line connected thereto, means to supply strong solution from the generator to the absorber, means to supply weak solution from the absorber to the generator, and means to return condensate from the condenser to the evaporator.

7. An absorption refrigeration system according to claim 6 in which the evaporator includes the pan-like member extending longitudinally of the shell, supports for the pan extending longitudinally of the shell attached to bar members on the terminal portions of the shell, a plurality of tubes placed within above the pan through which medium to be cooled passes, support sheets for the tubes, eliminators supported on the pan extending longitudinally of the shell and placed on opposite sides of the tubes, the discharge means for recirculated refrigerant being supported in the shell above the tubes, a condensate return header connected to the condensate return means placed in the shell above the tubes and having openings therein to discharge condensate over the tubes, and baffles closing the top of the evaporator to assure vapor flowing through the eliminators to the absorber.

8. An absorption refrigeration system according to claim 7 in which the strong solution supply means to the absorber includes a box-like member mounted on the side of the shell adjacent the absorber, said member having an inlet port therein and an outlet port therein through the shell, a partition member in the box member forming a valve seat and a movable diaphragm member adapted to nest against the seat to discontinue passage of solution through the box.

9. In an absorption refrigeration system, the combination of a generator, a condenser, a shell containing an absorber and an evaporator, vapor from the evaporator flowing to the absorber to be absorbed by solution therein, the absorber including a plurality of tubes through which cooling medium is passed in heat exchange relation with solution and vapor exteriorly of the tubes, said evaporator including a pan-like member extending longitudinally of the shell and cooperating with the shell to form the evaporator, supports for the pan extending longitudinally of the shell attached to bar members on the ends of the shell, a plurality of tubes placed within the evaporator through which medium to be cooled passes, support sheets for the tubes, eliminators supported on the pan extending longitudinally of the shell and placed on opposite sides of the tubes, discharge means for recirculated refrigerant supported in the shell above the tubes, a condensate return header placed in the shell above the tubes having openings therein to discharge condensate over the tubes, and baffles closing the top of the evaporator to assure vapor flowing through the eliminators to the absorber, means to forward weak solution from the absorber to the generator, means to supply condensate to the return header in the evaporator, means to supply strong solution from the generator to the absorber, means to circulate a solution of intermediate concentration in the absorber, and means to withdraw liquid refrigerant from the evaporator and to return the liquid refrigerant through said discharge means in the evaporator in heat exchange relation with medium passing through the tubes therein.

10. Absorption refrigeration system according to claim 9 in which the means to supply strong solution from the generator to the absorber includes a box-like member mounted on the side of the shell having an inlet port therein and an outlet port therein extending through the shell, a partition member in the box forming a valve seat and a movable diaphragm member adapted to nest against the seat to discontinue passage of solution through the box.

11. In an absorption refrigeration system, the combination of a generator, a condenser, a shell containing an absorber and an evaporator, vapor from the evaporator flowing through the absorber to be absorbed by solution therein, the absorber including a plurality of tubes through which cooling medium is passed in heat exchange relation with solution and vapor exteriorly of the tubes, a pan-like member in the shell cooperating with the shell to form the evaporator, said pan being disposed above the tubes in the shell, means to supply strong solution from the generator to the absorber, said supply means including a box-like member mounted on the side of the shell having an inlet port therein and an outlet port therein through the shell, a partition member in the box forming a valve seat, and a movable diaphragm member adapted to nest against the seat to discontinue passage of solution through the box, means to supply weak solution from the absorber to the generator, and means to recirculate solution through the evaporator.

12. Absorption refrigeration system according to claim 11 in which means are provided for moving the diaphragm member toward the partition to seat against the top of the partition.

13. An absorption refrigeration system according to claim 12 in which the top wall of the partition possesses a concave configuration to cooperate with the convex curvature of the diaphragm member when it is moved downward against the partition.

14. An absorption refrigeration system according to claim 15 in which one terminal tube sheet has a slot therein extending laterally of the sheet adjacent the evaporator, a header member attached to the exterior of the slotted sheet adjacent the slot, a line connecting the header with the recirculating means, the slot connecting the header with the evaporator pan whereby liquid refrigerant collected in the bottom of the pan passes through the slot to the header and is supplied from the header by the recirculating means to discharge means in the evaporator.

15. In an absorption refrigeration system, the combination of a generator, a condenser, a shell containing an absorber and an evaporator, vapor from the evaporator flowing to the absorber to be absorbed by solution therein, the absorber including a plurality of tubes through which cooling medium is passed in heat exchange relation with solution and vapor exteriorly of the tubes, a pan-like member in the shell cooperating with the shell to form the evaporator, said member being disposed above the tubes in the shell, said evaporator including a heat exchange member through which medium to be cooled passes, terminal support sheets for the heat exchange member forming the ends of said pan-like member, means to forward weak solution from the absorber to the generator, means to discharge liquid refrigerant in the evaporator in heat exchange relation with medium passing through the heat exchange member, means to supply strong solution from the generator to the absorber, means to circulate solution of intermediate concentration in the absorber, one terminal sheet having a slot therein extending laterally of the machine, a header member attached to the exterior of said slotted terminal sheet, the slot connecting the header with the evaporator pan whereby liquid refrigerant collected in the bottom of the pan passes through the slot to the header, a pump to withdraw liquid refrigerant from the evaporator and to return the liquid refrigerant to the evaporator discharge means, a line connecting the header with the pump, a line connecting the pump with the liquid refrigerant discharge means, an overflow arrangement connected to the evaporator to regulate level of liquid refrigerant collected therein, said arrangement discharging excess liquid refrigerant into the absorber to mix with solution therein, and means to return condensate from the condenser to the evaporator.

References Cited in the file of this patent

UNITED STATES PATENTS

| | | |
|---|---|---|
| 1,632,524 | Weisman | June 14, 1927 |
| 1,949,737 | Charavay | Mar. 6, 1934 |

(Other references on following page)

UNITED STATES PATENTS

| | | |
|---|---|---|
| 2,317,234 | Thomas | Apr. 20, 1943 |
| 2,461,513 | Berstneff | Feb. 15, 1949 |
| 2,473,389 | Reid | June 14, 1949 |
| 2,485,844 | Reid | Oct. 25, 1949 |
| 2,494,972 | Thomas | Jan. 17, 1950 |
| 2,550,429 | Reid | Apr. 24, 1951 |
| 2,579,396 | Philipp | Dec. 18, 1951 |
| 2,647,302 | Hopwood | Aug. 4, 1953 |
| 2,689,466 | Whitlow | Sept. 21, 1954 |
| 2,709,347 | Simpson | May 31, 1955 |
| 2,713,778 | Berry | July 26, 1955 |